June 18, 1940.　　　A. J. SEISS　　　2,204,707

BICYCLE LAMP

Filed Feb. 26, 1938

Inventor

August J. Seiss

By Faust F. Crampton

Attorney

Patented June 18, 1940

2,204,707

UNITED STATES PATENT OFFICE 2,204,707

BICYCLE LAMP

August J. Seiss, Toledo, Ohio

Application February 26, 1938, Serial No. 192,823

4 Claims. (Cl. 240—7.55)

My invention has for its object to provide an efficient electric bicycle dry battery lamp. The invention particularly relates to structural parts which are so formed that the dry battery cells may be readily replaced and, also, whereby many of the contacting parts of the lamp may be elastically held in position to eliminate relative displacement and jarring against each other.

The invention also provides a means for elastically securing the lamp reflector, the lens, and the battery cells in position.

The invention provides a removable elastic sheet metal shell that encloses the dry battery cells, the end parts of the shell being formed to cause the shell to elastically maintain electric connection between the lamp and the cells.

The invention may be contained in lamps of different forms and to illustrate a practical application of the invention, I have selected a bicycle head lamp as illustrative of an embodiment of the invention and shall describe the selected lamp hereinafter.

Figure 1:
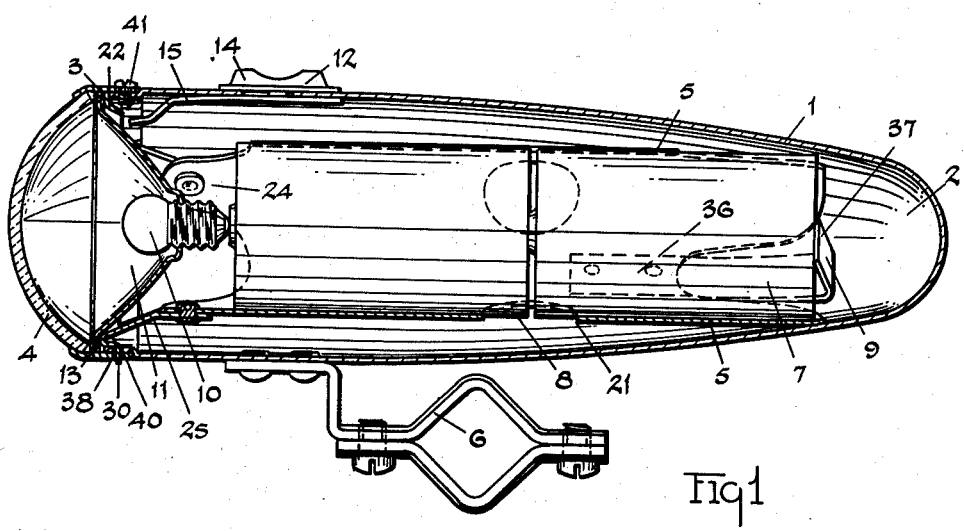
Figure 2:
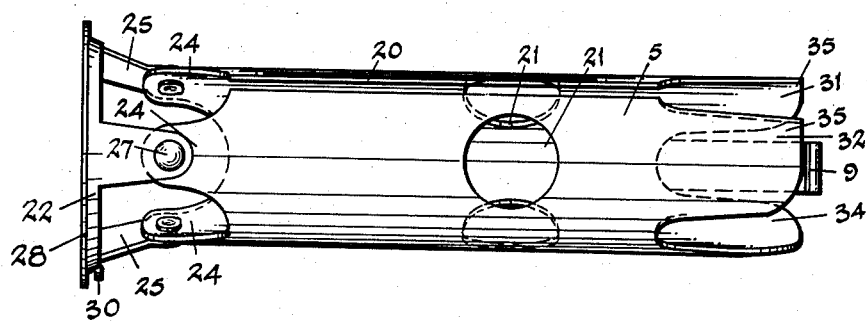

Fig. 1 is a longitudinal section of the lamp. Fig. 2 illustrates a side view of the battery-supporting shell when in a position different from that shown in Fig. 1, to show relation of certain parts of the shell.

The lamp shell 1 has a substantially torpedo or "streamline" shape. It is formed to have a progressively decreasing diameter, the rear end terminating in a substantially paraboloidal part 2. The forward end is closed by means of a lens 4 which is secured in position by means of a ring 3. The lamp may be supported by means of a suitable bracket 6.

The lamp shell contains a dry battery-supporting shell 5 in which electrically connected cells 7 and 8 of the battery are located. The shell 5 is formed of elastic sheet metal shaped cylindrically and split to form the slot 20 having spaced edge parts. The diameter of the shell 5 is such as to encircle the cells and elastically and frictionally contact with the insulating material, such as paper, commonly secured to and used for covering the cells. The shell 5 is provided with a spring contact 9 that engages the sloping end wall of the shell 1 and is pressed thereby against the metal bottom of the cell 7 to electrically connect the wall of the shell 1 with the dry battery. The corners formed by the slot 20 and the end edge of the shell 5 engage the rear sloping wall of the shell 1 and operate to yieldingly draw the opposed edge parts of the slot 20 toward each other and clamp the cells 7 and 8 and, also center the cell and battery shell in the rear end of the lamp shell.

The shell 1 also has, at its forward end, a lamp 10 and a metal reflector 11 in which the lamp 10 is secured in position to connect its central contact with the end contact of the cell 8 of the battery and to connect the sleeve contact of the lamp 10 with the reflector 11. The edge part of the reflector is insulated by insulating sheet material 13.

A switch 12 is slidably supported on the wall of the shell 1. The switch has an exteriorly located finger piece 14 by which an interiorly located contact 15 may be moved into position to make contact with the reflector 11 to complete a circuit through the cells, the lamp 10, the reflector 11, the contact 15, and the wall of the shell 1 to the metal bottom of the cell 7.

The metal of the shell 5 is also cut to form relatively large openings 21 having centers which are disposed substantially in the plane of the contiguous ends of the cells 7 and 8, whereby, upon removal of the shell 5 from the shell 1, the central contact of the cell 7 and the bottom contact of the cell 8 may be readily viewed to determine the degree of oxidation and determine whether there is reasonably good connection between the cells of the battery without removal of the cells from the shell 5.

The shell 5 is connected to a ring 22 by means of ears 24 formed from the metal of one end of the shell 5 and also by fingers 25 that are connected to the ears 24 by suitable rivets 27. The fingers 25 are struck-up from the metal from which the ring 22 is formed and are bent to flare outwardly with respect to the axis of the shell 5. The ring 22 has an outwardly extending flange 28 and an outwardly extending lug 30 that protrudes from a rear edge part of the ring 22. The width of the ring, as measured parallel to the axis of the shell, is formed narrow and frustumal.

The rear end of the elastic sheet metal shell 5 is formed to have tongues 31, 32, and 34 and the longitudinal dimension of the shell, including the ring attached thereto, is such that when the shell 5 is secured in position within the shell 1, the end edge parts of the tongues 31, 32, and 34 engage the curved side wall of the shell 1 near the rear end thereof and are forced toward each other, which is elastically resisted and tends to press the battery shell 5 endwise toward the forward end of the lamp shell 1 and the battery shell against the flange of the reflector. The tongues 31 and 32 are formed from portions of the shell 5 located on opposite sides of the slot 20 and have corners 35 that engage the sloping wall to bias the metal of the shell toward closure of the slot.

An end part 36 of the spring 9 is secured to the shell 5 to locate the bent end part 37 of the spring 9 intermediate the tongues 31 and 34. It also has an end part 37 bent inwardly to engage the bottom contact of the cell 7. When the shell 5 is moved inward to its normal position within the shell 1, the spring 9 is engaged by the sloping wall of the shell 1 at the point of its bend to increase its rigidity and the pressure of the spring against the metal bottom of the cell 7. Thus, when the shell 5 is inserted in position in the shell 1 and the lens 4 is secured in its position, the edge of the reflector 11 and the cells 7 and 8 are yieldingly pressed by the elasticity of the shell 5.

When the shell 5 is inserted in the shell 1, the tongues 31, 32, and 34 and the spring 9 engage and are pressed against the sloping wall of the shell 1 to elastically and yieldingly resist the inward movement and produce a bias toward the other end of the shell 1. The shell 5 is secured in position by the insertiton of the lug 30 in slots 38 and 40, one located in the wall of the shell 1 and the other located in the ring 3, whereby the lens 4, the flange 28, and the reflector 11 are secured in the shell 1 and the cells and contacts of the cells and the lamp are elastically pressed to maintain continuity of the electric circuit. The sloping or frustumal edge and the narrow width of the ring 22 enables ready insertion of the lug 30 and into the slots 38 and 40 as the parts are assembled and moved together with the reflector 11 and the shell 5 into their respective positions in the shell 1 against the yielding pressure of the inner end parts of the shell 5 until the lug 30 snaps into the aligned slots 38 and 40. The closure ring 3 is then secured by the screw 41 that is threaded into the wall of the shell 1. Removal or loosening of the parts is produced by removing the screw 41 and merely laterally moving the ring 22 to withdraw the lug 30 from the slots, whereupon, the elastic parts of the inner end of the shell 5 operate to press the parts outwardly from the shell 1. The sloping surface of the ring permits its relative lateral movement of the sloping part across the edge of the lamp shell 1 to release the elastically clamped parts. The forward end of the battery shell 5 is thus projected from the lamp shell 1 where it may be readily grasped by the hand and withdrawn. This enables examination of the contacts of the cells and, if required, ready replacement of the cells.

I claim:

1. In a dry battery lamp, a lamp shell having a rear end wall sloping toward the central longitudinal axis of the shell, a split battery-enclosing shell formed of elastic sheet material, a battery cell located in the battery shell, an electric bulb, the bulb and the cell having electric contacts, the rear end of the battery shell having a plurality of elastic tongues engaged by the sloping wall upon insertion of the battery shell into the lamp shell for frictionally and elastically engaging the battery cell for centering the battery shell within the rear end of the lamp shell and biasing the contact of the battery cell toward the lamp contact.

2. In a battery lamp, a lamp shell having a tapering rear end wall sloping toward the central longitudinal axis of the shell, a split battery-enclosing shell formed of elastic sheet material and located in the lamp shell and having rear end parts engaged by the end wall to center and reduce the rear end of the battery shell, a battery cell located in the battery shell and elastically and frictionally engaged by said rear end parts of the battery shell when the battery cell and the battery shell are inserted in the lamp shell and the rear end of the battery shell is pressed against the tapering rear end of the lamp shell.

3. In a dry battery lamp, a lamp shell having a rear end wall sloping toward the central longitudinal axis of the shell, a battery-enclosing shell formed of elastic sheet material located in the lamp shell, a battery cell located in the battery shell, an electric bulb, a reflector for supporting the bulb, means located in the forward end of the lamp shell for engaging the reflector, a plurality of elastic parts supported on the battery shell and engaged by the rear end sloping wall for elastically centering the rear end of the battery shell and elastically pressing the battery shell against the reflector upon insertion of the battery shell and the reflector in position in the lamp shell.

4. In a dry battery lamp, a lamp shell having a wall sloping toward the central longitudinal axis of the shell, a battery-enclosing shell formed of elastic sheet material located in the lamp shell and having a slotted end portion, a battery cell located in the battery shell and having a contact, an electric bulb having a contact, the corner parts formed at the end of the slotted end portion of the battery shell adapted to be engaged by the sloping wall upon insertion of the battery shell in the lamp shell and be deflected inwardly with respect to the battery shell to engage the battery for pressing the battery and lamp contacts one against the other and the surface of the battery cell against the inner surface of the battery shell.

AUGUST J. SEISS.